United States Patent
Kuo et al.

(10) Patent No.: US 9,736,725 B2
(45) Date of Patent: Aug. 15, 2017

(54) METHOD AND APPARATUS FOR APPLYING SIGNALING OF WLAN-3GPP INTERWORKING

(71) Applicant: INNOVATIVE SONIC CORPORATION, Taipei (TW)

(72) Inventors: Richard Lee-Chee Kuo, Taipei (TW); Meng-Hui Ou, Taipei (TW)

(73) Assignee: INNOVATIVE SONIC CORPORATION, Taipei (TW)

(*) Notice: Subject to any disclaimer, the term of this patent is extended or adjusted under 35 U.S.C. 154(b) by 96 days.

(21) Appl. No.: 14/484,801

(22) Filed: Sep. 12, 2014

(65) Prior Publication Data

US 2015/0078153 A1    Mar. 19, 2015

Related U.S. Application Data

(60) Provisional application No. 61/878,221, filed on Sep. 16, 2013, provisional application No. 61/887,600, filed on Oct. 7, 2013.

(51) Int. Cl.
*H04J 3/06* (2006.01)
*H04W 28/08* (2009.01)
*H04W 76/04* (2009.01)

(52) U.S. Cl.
CPC ......... *H04W 28/08* (2013.01); *H04W 76/046* (2013.01)

(58) Field of Classification Search
CPC ............. G06F 12/0862; G06F 12/0866; G06F 2212/465
See application file for complete search history.

(56) References Cited

U.S. PATENT DOCUMENTS

| 2012/0324100 A1* | 12/2012 | Tomici | H04L 45/123 709/224 |
| 2012/0329402 A1* | 12/2012 | Ren | H04W 24/10 455/67.11 |
| 2013/0122892 A1* | 5/2013 | Morioka | H04B 7/155 455/422.1 |
| 2015/0078153 A1* | 3/2015 | Kuo | H04W 76/046 370/230 |
| 2015/0249900 A1* | 9/2015 | Kim | H04W 24/10 370/252 |
| 2015/0358884 A1* | 12/2015 | Nagasaka | H04W 36/22 370/230 |

OTHER PUBLICATIONS

3GPP TSG-RAN WG2 #83, Barcelona, Aug. 19-23, 2013 (R2-132649).
Office Action on corresponding JP Patent Application No. 2014-185946 dated Sep. 29, 2015.
3GPP TR 37.834 V0.4.0 (Aug. 2013).
3GPP TSG-RAN WG2 Meeting #83, Barcelona, Spain, Aug. 19-23, 2013 (R2-132327).
Search Report on corresponding EP Patent Application No. 14184755.8 dated May 8, 2015.

* cited by examiner

*Primary Examiner* — Alvin Zhu
(74) *Attorney, Agent, or Firm* — Blue Capital Law Firm, P.C.

(57) ABSTRACT

A method and apparatus are disclosed for applying signaling of WLAN-3GPP interworking. The method includes receiving a first configuration of an interworking parameter by dedicated signalling, wherein the first configuration is not released when the UE enters idle mode. The method also includes receiving a second configuration of the interworking parameter by broadcast signalling when the UE is in idle mode, and overriding the first configuration with the second configuration.

14 Claims, 13 Drawing Sheets

METHOD AND APPARATUS FOR APPLYING SIGNALING OF WLAN-3GPP INTERWORKING

CROSS-REFERENCE TO RELATED APPLICATIONS

The present Application claims the benefit of U.S. Provisional Patent Application Ser. No. 61/878,221 filed on Sep. 16, 2013 and U.S. Provisional Patent Application No. 61/887,600 filed on Oct. 7, 2013, the entire disclosures of these Provisional Patent Applications are incorporated herein by reference.

FIELD

This disclosure generally relates to wireless communication networks, and more particularly, to a method and apparatus for applying signalling of WLAN-3GPP (Wireless Local Area Network $3^{rd}$ Generation Partnership Project) interworking.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for applying signaling of WLAN-3GPP interworking. The method includes receiving a first configuration of an interworking parameter by dedicated signalling, wherein the first configuration is not released when the UE enters idle mode. The method also includes receiving a second configuration of the interworking parameter by broadcast signalling when the UE is in idle mode, and overriding the first configuration with the second configuration.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-122038, "New Study Item Proposal on WLAN/3GPP Radio Interworking", Intel Corporation; TR 37.384 v0.4.0, "Study on WLAN/3GPP Radio Interworking (Release 12)"; R2-132797, "Dedicated Signaling to carry WLAN interworking Policy's assistance Information", Broadcom Corporation; and TS 36.331 V11.4.0, "E-UTRA RRC protocol specification (Release 11)". The exemplary wireless communication systems devices described below may further be designed to support IEEE 802.11 standard, "IEEE Standard for Information technology—Telecommunications and information exchange between systems Local and metropolitan area networks—Specific requirements Part 11: Wireless LAN Medium Access Control (MAC) and Physical Layer (PHY) Specifications". The standards and documents listed above are hereby expressly incorporated herein.

Figure 1:
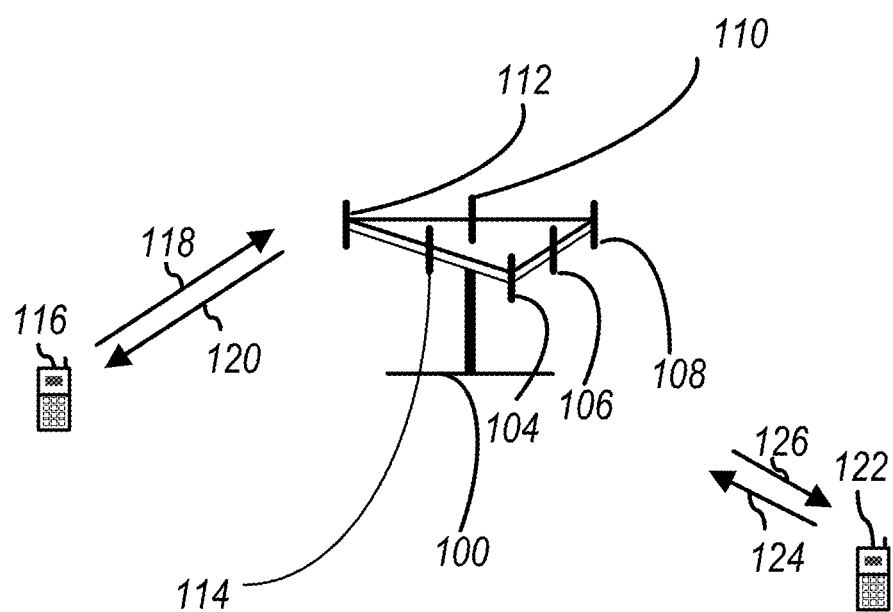
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
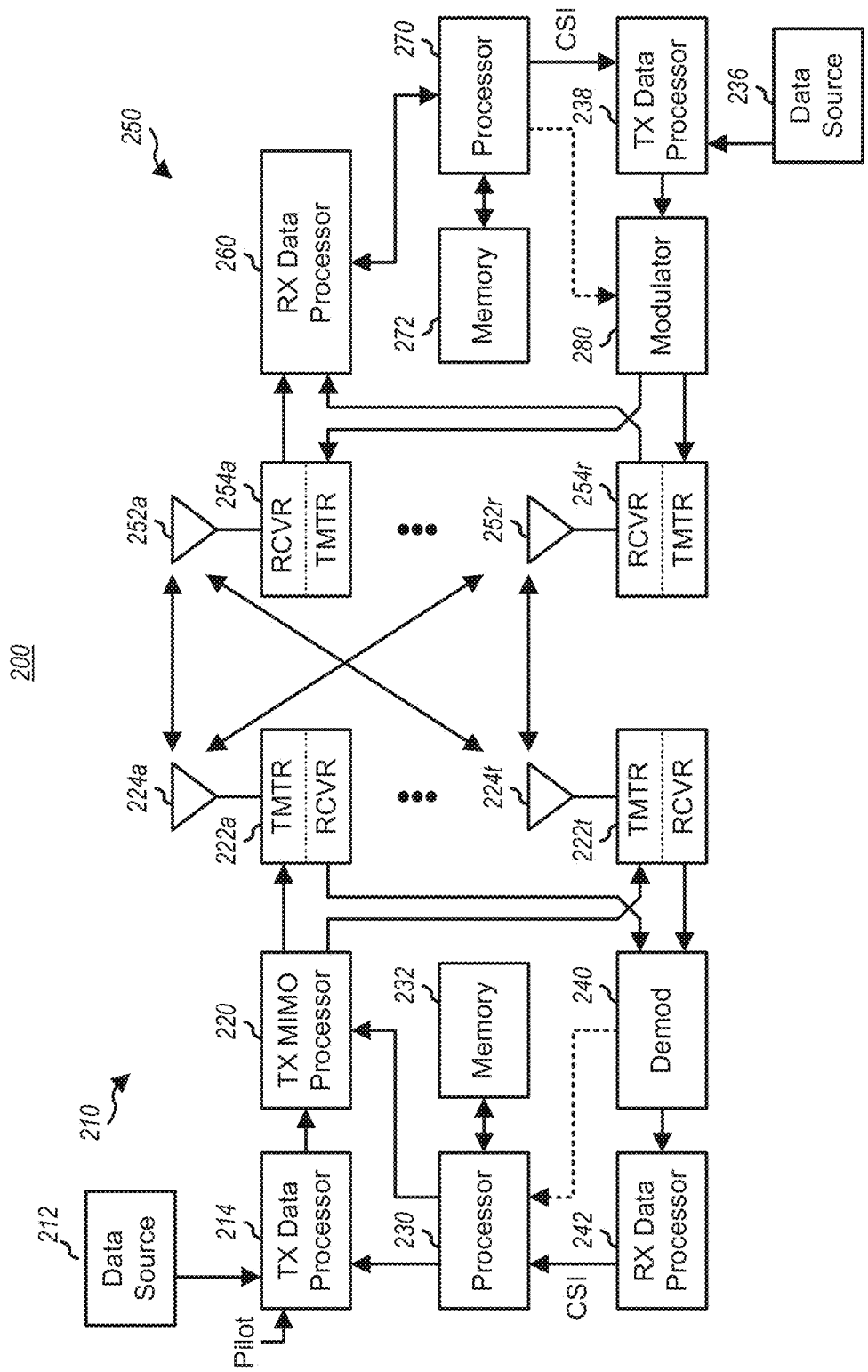
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
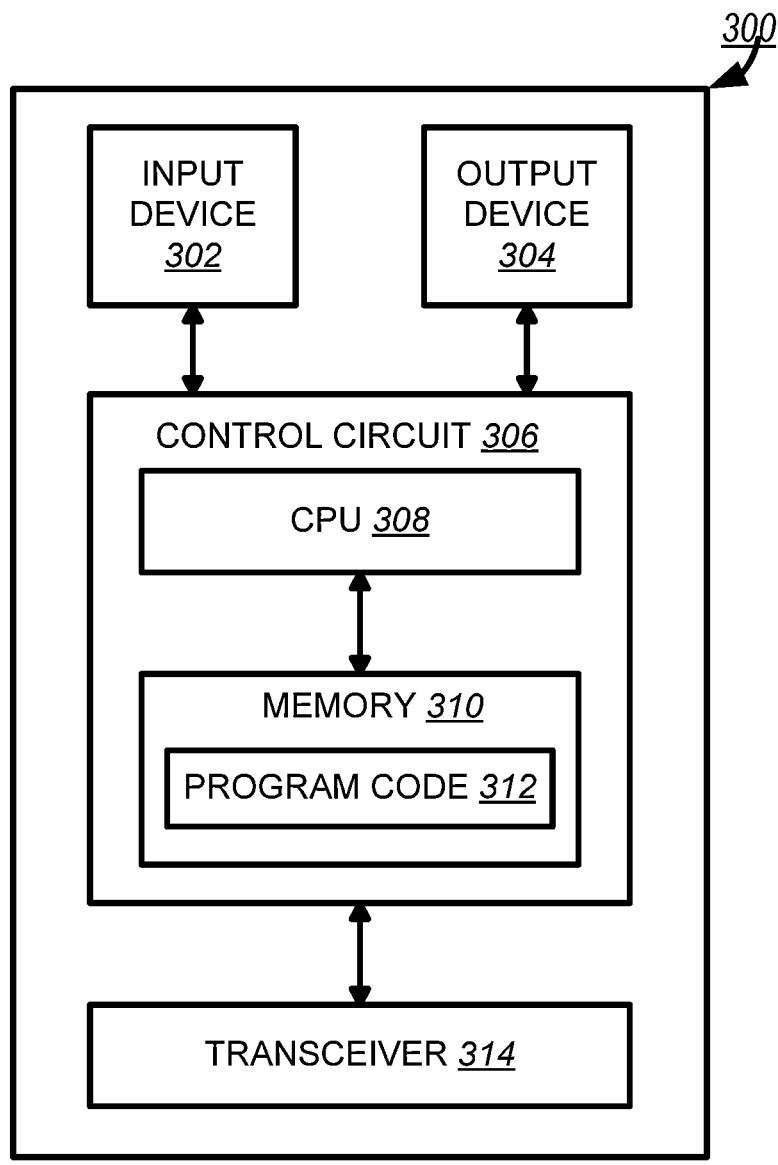
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
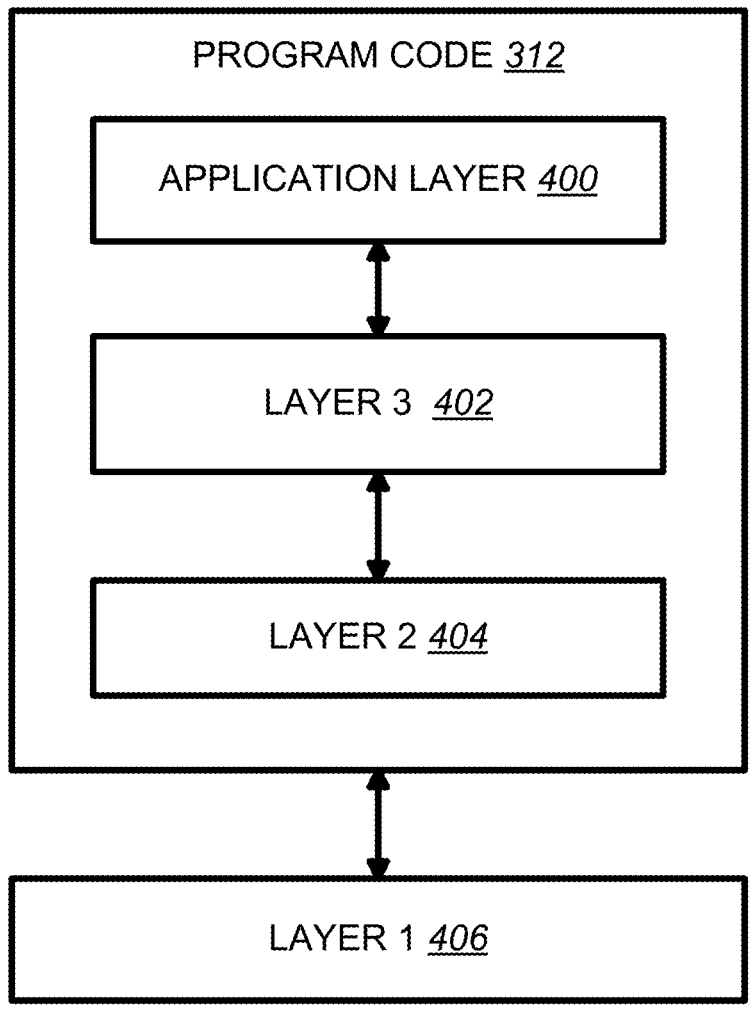
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The study item "WLAN/3GPP radio interworking" has been agreed to be studied in Release 12. The study item description is generally specified in 3GPP RP-122038 as follows:

The following issues should be taken into account during the study:
 1. Operator deployed WLAN networks are often underutilized
 2. User experience is suboptimal when UE connects to an overloaded WLAN network
 3. Unnecessary WLAN scanning may drain UE battery resources Moreover, some of the objectives of the study item are also specified in 3GPP RP-122038 as follows:

In a first phase:
 Identify the requirements for RAN level interworking, and clarify the scenarios to be considered in the study while taking into account existing standardized mechanisms.

In a second phase:
 Identify solutions addressing the requirements identified in the first phase which cannot be solved using existing standardized mechanisms, including:
  Solutions that enable enhanced operator control for WLAN interworking, and enable WLAN to be included in the operator's cellular Radio Resource Management.
  Enhancements to access network mobility and selection which take into account information such as radio link quality per UE, backhaul quality, load, etc for both cellular and WLAN accesses
 Evaluate the benefits and impacts of identified mechanisms over existing functionality, including core network based WLAN interworking mechanisms (e.g. ANDSF).

In general, 3GPP TR 37.384 v0.4.0 captures the progress of the study. 3GPP TR 37.384 v0.4.0 generally specifies the assumptions, requirements, scenarios, and use cases of the study as follows:

5.1 Assumptions
 1. There is no need to distinguish between indoor and outdoor deployment scenarios.
 2. Solutions developed as a result of this study should not rely on standardized interface between 3GPP and WLAN RAN nodes.
 3. A UE in coverage of a 3GPP RAT when accessing WLAN will still be registered to the 3GPP network and will be either in IDLE mode or in CONNECTED mode.
 4. Residential WLAN AP deployment should not be considered as part of this study.

5.2 Requirements
The candidate solutions to be considered in this study should meet the following requirements:
 1. Solutions should provide improved bi-directional load balancing between WLAN and 3GPP radio access networks in order to provide improved system capacity.
 2. Solutions should improve performance (WLAN interworking should not result in decreased but preferable in better user experience).
 3. Solutions should improve the utilization of WLAN when it is available and not congested.
 4. Solutions should reduce or maintain battery consumption (e.g. due to WLAN scanning/discovery).
 5. Solutions should be compatible with all existing CN WLAN related functionality, e.g. seamless and non-seamless offload, trusted and non-trusted access, MAPCON and IFOM.
 6. Solutions should be backward compatible with existing 3GPP and WLAN specifications, i.e. work with legacy UEs even though legacy UEs may not benefit from the improvements provided by these solutions.
 7. Solutions should rely on existing WLAN functionality and should avoid changes to IEEE and WFA specifications.
 8. Per target WLAN system distinction (e.g. based on SSID) should be possible.
 9. Per-UE control for traffic steering should be possible.
 10. Solutions should ensure that access selection decisions should not lead to ping-ponging between UTRAN/E-UTRAN and WLAN.

5.3 Scenarios
The scenario considered in this study focuses on WLAN nodes deployed and controlled by operators and their partners. There can be several WLAN access points within the coverage of a single UTRAN/E-UTRAN cell. The eNB/RNC may know the location or other WLAN AP parameters (e.g. BSSID, channel, etc. . . . ), however scenarios where such information is not available should be supported as well.

There is no RAN level information exchange between H(e)NBs/eNBs/RNCs and APs via standardized interface. At a later stage it can be analysed whether/which benefits could be achieved if a non-standardized interface between WLAN APs and 3GPP RAN is available.

Note: Some information exchange may be possible via OAM.

5.4 Use Cases
The following use cases should be considered in this study:
 A. UE is within UTRAN/E-UTRAN coverage, is using 3GPP and goes into WLAN AP coverage
 B. UE is within UTRAN/E-UTRAN and WLAN coverage, is using WLAN and goes out of WLAN AP coverage
 C. UE is within the coverage area of both, UE using WLAN, all or a subset of the UE's traffic should be routed via UTRAN/E-UTRAN instead
 D. UE is within the coverage area of both, UE using UTRAN/E-UTRAN, all or a subset of the UE's traffic should be routed via WLAN instead
 E. UE using both accesses and should be connected to only one (WLAN or UTRAN/E-UTRAN) or some traffic should be moved to the other access Furthermore, the latest update of the solution candidates is provided in 3GPP TR 37.384 v0.4.0 as follows:

6.1.1 Solution 1
In this solution RAN provides RAN assistance information to the UE through broadcast signaling (and optionally dedicated signaling). The UE uses the RAN assistance information UE measurements and information provided by WLAN and policies that are obtained via the ANDSF or via existing OMA-DM mechanisms or pre-configured at the UE to steer traffic to WLAN or to RAN.

This solution is applicable to UEs in RRC IDLE and RRC CONNECTED states for E-UTRAN, UE IDLE mode for UTRAN and CELL_DCH, CELL_FACH, CELL_PCH and URA_PCH states for UTRAN.

Figure 5:
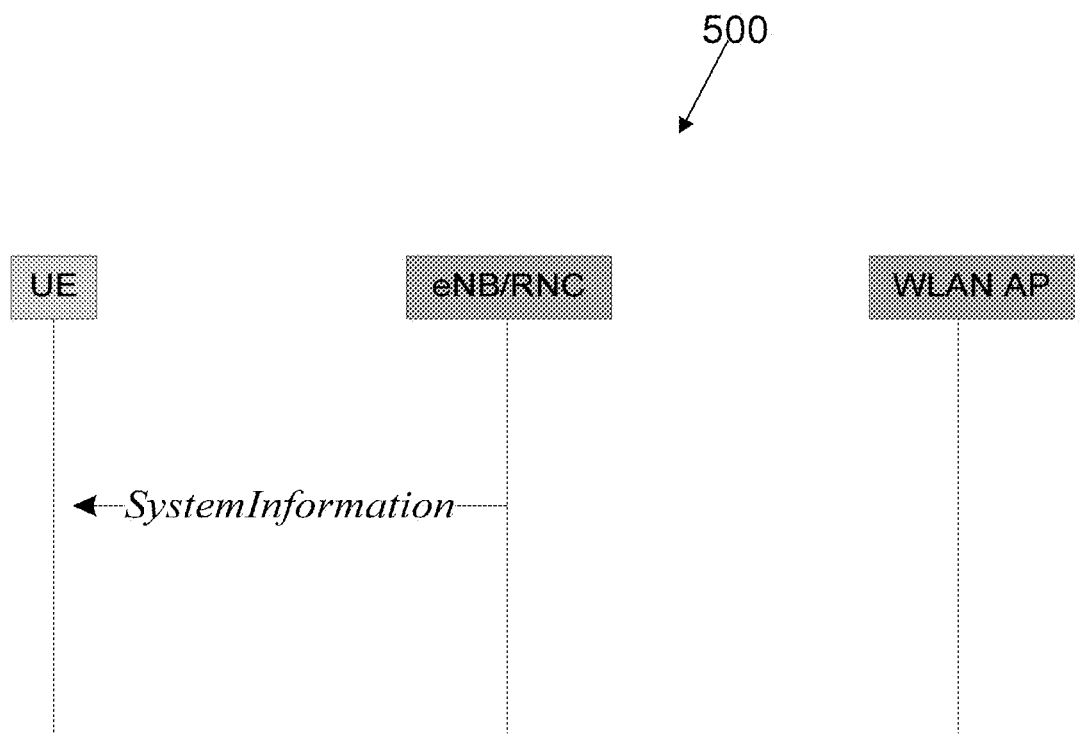
FIG. 5 is a reproduction of FIG. 6.1.1.1-1 entitled "Solution 1: Traffic steering" of 3GPP TR 37.384 v0.4.0 according to one exemplary embodiment.
Figure 6:
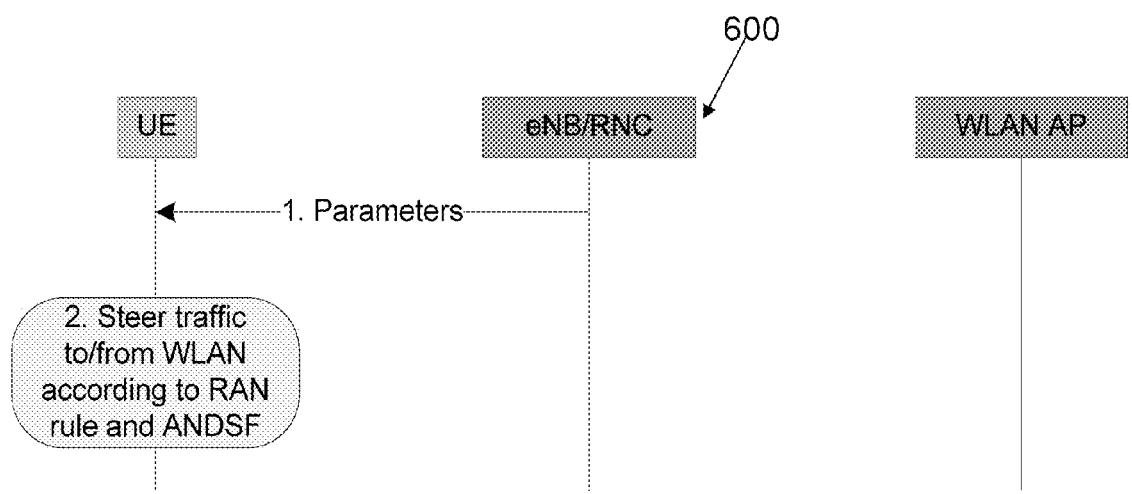
FIG. 6 is a reproduction of FIG. 6.1.2.1-1 entitled "Solution 2: Traffic steering" of 3GPP TR 37.384 v0.4.0 according to one exemplary embodiment.

6.1.1.1 Description
[FIG. 5 (which is a reproduction of FIG. 6.1.1.1-1 entitled "Solution 1: Traffic steering" of 3GPP TR 37.384 v0.4.0)] illustrates solution 1 candidate call flow:

RAN Assistance Information

The following table shows candidate assistance parameters which may be provided by RAN:

TABLE 6.1.1.1-1

Candidate assistance parameters provided by RAN

| Parameter | Description |
|---|---|
| Load Information | Direct/indirect indication of UMTS/LTE load, e.g. in percentage, in load levels (low, medium, high) or offload preference indicator |
| Resource Allocation | Maximum resource allocation the UE may receive on UMTS/LTE |
| WLAN Thresholds | WLAN RSSI threshold, WLAN BSS load threshold and WLAN WAN metric threshold |
| RAN Thresholds | RSRP/RSCP thresholds |

Policy Information

The policies provided to the UE are enhanced by having the RAN assistance information:

The policy may include multiple candidate information simultaneously. An example of such policy may be as follow:

3GPP→WLAN: If RAN RSRP is less than threshold s and RAN direct load is greater than threshold x, and if WLAN RSSI is greater than threshold r and WLAN BSS load is less than threshold y, move flow to WLAN WLAN→3GPP: If RAN RSRP is greater than threshold s' and RAN direct load is less than threshold x', and if WLAN RSSI is less than threshold r' and WLAN BSS load is greater than threshold y', move flow to UMTS/LTE This can be realised e.g. with a new policy structure (similar to ISRP). The value of the thresholds (e.g. RAN RSRP/RSCP thresholds) may be provided by RAN and used in the ANDSF policy. Otherwise threshold values may also be provided by the ANDSF itself.

Policies specific to the UE can be configured or pre-provisioned based on the UE subscription. Optionally per UE control for traffic steering can be achieved using dedicated signalling during connected mode, e.g. the RAN may send different values of the above parameters to different UEs in connected mode. Policies specific to a target WLAN system (e.g. SSID, realm) can be configured or pre-provisioned. Policies and network assisted information can also be used to route some flow to WLAN and some to 3GPP.

There are possible mechanisms to avoid simultaneous massive access network selection/traffic steering and ping-pong events, e.g., hysteresis, randomization, different threshold values for 3GPP-to-WLAN than WLAN-to-3GPP network selection, or thresholds on per user subscription level which may be applied to UE based decision.

. . .

6.1.2 Solution 2

In this solution the offloading rules are specified in RAN specifications. The RAN provides (through dedicated and/or broadcast signaling) thresholds which are used in the rules. This solution is applicable to UEs in RRC IDLE and RRC CONNECTED states for E-UTRAN, UE IDLE mode for UTRAN and CELL_FACH, CELL_PCH, URA_PCH and CELL_DCH states for UTRAN).

6.1.2.1 Description

This solution consists of the following steps, which is described in [FIG. 6 (which is a reproduction of FIG. 6.1.2.1-1 entitled "Solution 2: Traffic steering" of 3GPP TR 37.384 v0.4.0)].

For the above signaling procedure [shown in FIG. 6], each step is elaborated below.

Step 1:

The RAN provides parameters through dedicated signaling and/or broadcast signaling.

Step 2:

The UE follows RAN rules, defined in 3GPP RAN specifications, to perform bi-directional offloading between WLAN and 3GPP. User preference should take precedence.

Rule Example:

```
if (measured_metricA < threshold1) && (measured_metricB > threshold2) {
  steerTrafficToWLAN( );
} else if (measured_metricA > threshold3) | | (measured_metricB < threshold4) {
  steerTrafficTo3gpp( );
}
```

In addition, if the UE has been configured with ANDSF rules, the ANDSF rules should not be broken, details are FFS.

It is FFS whether and how per bearer steering will be done, if ANDSF is not present.

. . .

6.1.3 Solution 3

In this solution the traffic steering for UEs in RRC CONNECTED/CELL_DCH state is controlled by the network using dedicated traffic steering commands, potentially based also on WLAN measurements (reported by the UE).

For UEs in IDLE mode and CELL_FACH, CELL_PCH and URA_PCH states the solution is similar to solution 1 or 2. Alternatively, UEs in those RRC states can be configured to connect to RAN and wait for dedicated traffic steering commands.

User preference always takes precedence over RAN based or ANDSF based rules (e.g. when a non-operator WLAN is preferred or WLAN is off).

In this solution:

if ANDSF is not present, the UE moves the traffic indicated in the steering command to WLAN or 3GPP as indicated;

when multiple access networks are possible according to the ANDSF policy, the traffic steering commands can override order of access network priorities, e.g. if for certain IP flows ANDSF indicates a prioritized order of 3GPP access and WLAN, upon reception of a command to steer traffic from 3GPP access to WLAN, the UE moves the corresponding flows to WLAN.

The dedicated traffic steering command cannot override ANDSF in other cases i.e. the UE will not move traffic to an access network not indicated by ANSDF as a possibility (i.e. not indicated or indicated as forbidden).

NOTE: The above rules apply whether the H-ANDSF or the V-ANDSF policy are active. Some areas that are left FFS are, for example, handling of roaming requirements, ping-pong, UE subscription, WLAN measurement accuracy.

6.1.3.1 Description

Figure 7:
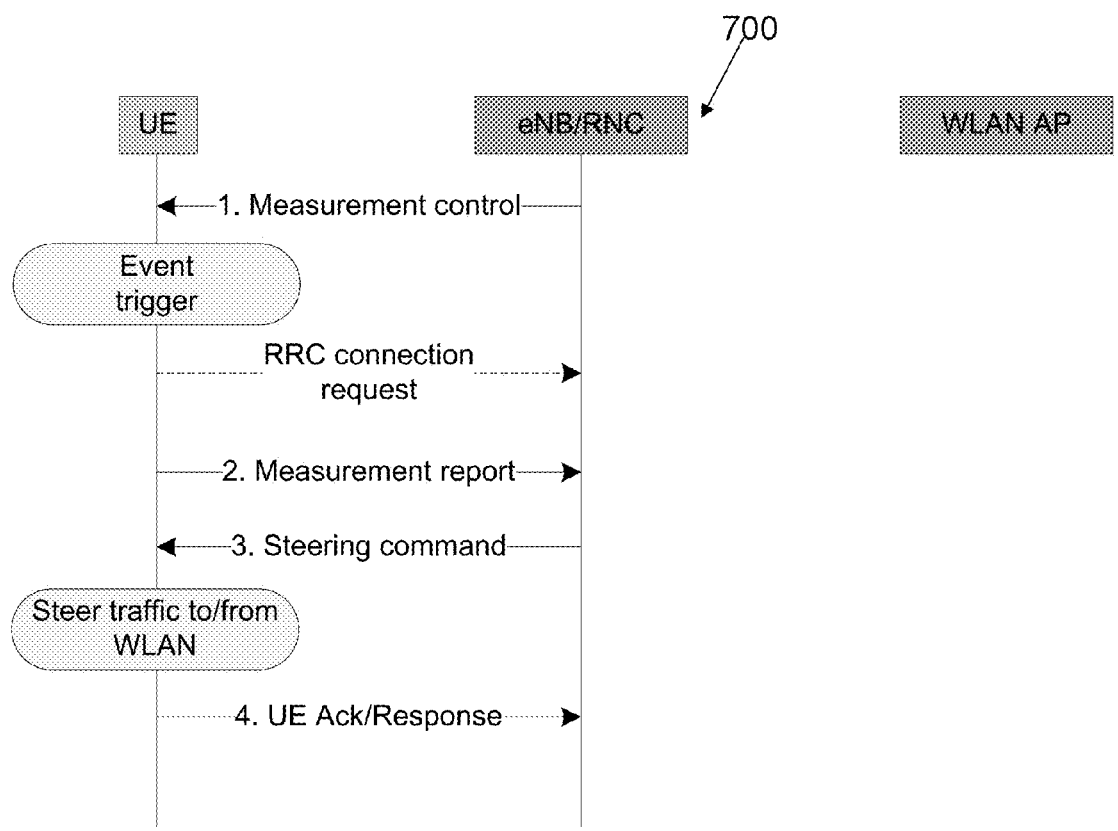
FIG. 7 is a reproduction of FIG. 6.1.3.1-1 entitled "Solution 3: Traffic steering for UEs in RRC CONNECTED/CELL_DCH state" of 3GPP TR 37.384 v0.4.0 according to one exemplary embodiment.

As an example, traffic steering for UEs in RRC CONNECTED/CELL_DCH comprises the following steps as shown in [FIG. 7 (which is a reproduction of FIG. 6.1.3.1-1 entitled "Traffic steering for UEs in RRC CONNECTED/CELL_DCH state" of 3GPP TR 37.384 v0.4.0)]:

1. Measurement control: The eNB/RNC configures the UE measurement procedures including the identity of the target WLAN to be measured.
2. Measurement report: The UE is triggered to send MEASUREMENT REPORT by the rules set by the measurement control.
3. Traffic steering: The eNB/RNC sends the steering command message to the UE to perform the traffic steering based on the reported measurements and loading in the RAN.

NOTE: The above procedures do not take into account user preference and/or the WLAN radio state. For example, based on user preferences and/or WLAN radio state, a UE may not be able to perform the configured measurement events. Additionally, the procedures need to allow a UE to be able to prioritize non-operator WLAN over operator WLAN. For example, the UE may disassociate from the operator WLAN and associate with the higher priority non-operator WLAN at any time during the measurement process. The details of how this is managed are FFS.

NOTE: The procedure illustrated above, and the following description can apply to UMTS CELL_FACH as well. The procedure can also be extended to UMTS/LTE Idle modes and UMTS CELL/URA_PCH states, e.g. UEs may be configured to report some indication (e.g. on available WLAN measurements) in a RRC UL message, e.g., RRC connection request (from Idle, in UMTS/LTE) or CELL UPDATE (in UMTS CELL/URA_PCH states).

NOTE: Some of the steps above, e.g. steps 1&2, can be optional, based on RAN/UE configuration.

Step 1: Measurement Control

For measurement control, the following examples are types of information can be configured for the UE to measure the operator WLAN:

1. Measurement events to trigger reporting as defined in Table 6.1.3.1-1
2. Target identification as defined in Table 6.1.3.1-2
3. Measurements to report as defined in Table 6.1.3.1-3

Based on the measurement events defined in TS 36.331 and TS 25.331, Table 6.1.3.1-1 shows the candidate measurement events for WLAN:

TABLE 6.1.3.1-1

Candidate measurement events for reporting WLAN

| Event | Description |
|---|---|
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold1 and WLAN's radio quality becomes better than threshold2 (to trigger traffic steering to WLAN) |
| W4 | WLAN's radio quality becomes worse than threshold1 and 3GPP Cell's radio quality becomes better than threshold2 (to trigger traffic steering from WLAN) |

NOTE:
The thresholds are based on the values of the measurements to report defined in Table 6.1.3.1-3.

The target identification is used to indicate to the UE which WLAN to consider for the measurement control procedures including the target WLAN ID and the operating channels to search for. Table 6.1.3.1-2 shows the candidate target identifiers for WLAN.

NOTE: For steering traffic from WLAN, i.e., W2/W4, it may be sufficient that just the serving WLAN below a threshold is reported, i.e. the WLAN target identifiers are not needed.

TABLE 6.1.3.1-2

Candidate target identifiers for WLAN

| Identifier | Description | Availability in WLAN |
|---|---|---|
| BSSID | Basic service set identifier. For infrastructure BSS, the BSSID is the MAC address of the wireless access point | Beacon or Probe Response |
| SSID | Service Set Identifier. The SSID can be used in multiple, possibly overlapping, BSSs | Beacon or Probe Response |
| HESSID | Homogeneous Extended Service Set Identifier. A MAC address whose value shall be configured by the Hotspot Operator with the same value as the BSSID of one of the APs in the network. All APs in the wireless network shall be configured with the same HESSID value. | Beacon or Probe Response (802.11) |
| Domain Name List | Domain Name list element provides a list of one or more domain names of the entity operating the WLAN access network. | ANQP (HS 2.0) |
| Operating class, channel number | Indication of the target WLAN frequency. See Annex E of 802.11 [5] for definitions of the different operating classes | N/A |

NOTE:
If above information is not available in (e)NB/RNC, it is possible for RAN to configure general WLAN measurements Step 2: Measurement Report Table 6.1.3.1-3 shows the candidate measurements to report for WLAN-

TABLE 6.1.3.1-3

Candidate measurement to report for WLAN

| Identifier | Description | Availability in WLAN |
|---|---|---|
| RCPI | Received Channel Power Indicator Measure of the received RF power in the selected channel for a received frame in the range of −110 to 0 dBm | Measurement |
| RSNI | Received Signal to Noise Indicator. An indication of the signal to noise plus interference ratio of a received IEEE 802.11 frame Defined by the ratio of the received signal power (RCPI-ANPI) to the noise plus interference power (ANPI) in steps of 0.5 dB in the range from −10 dB to +117 dB | Measurement |
| BSS Load | Contains information on the current STA population and traffic levels in the BSS. | Beacon or Probe Response (802.11k) |
| WAN metrics | Includes estimates of DL and UL speeds and loading as well as link status and whether the WLAN AP is at capacity. | ANQP (HS 2.0) |

Step 3: Traffic Steering

Table 6.1.3.1-4 shows candidate examples for identifying the traffic to steer to or from WLAN.

TABLE 6.1.3.1-4

Candidate identifiers of the traffic to steer to or from WLAN

| Identifier | Description |
|---|---|
| DRB/RB-ID | Identity of a radio bearer |
| QCI | QoS Class Identifier |

According to 3GPP TR 37.384 v0.4.0, assistance information or parameter needs to be provided to UEs in all solutions. For Solution 3, the assistance information or parameter may be used for idle mode UEs. The information or parameters could be provided by broadcast signaling or dedicated signaling.

3GPP R2-132797 addresses the following issue: which value should be applied if the value provided by broadcast signaling is different from the value provided by dedicated signaling? In general, 3GPP R2-132797 proposes that when the assistance information provided in the SIB (System Information Broadcast) and in the dedicated signalling are different, the UE should use the assistance information provided in the dedicated signalling. More specifically, 3GPP R2-132797 states:
If the UE receive a different RAN assistance information values from System Information (generic values) and the dedicated RAN assistance information enabled, it should ignore the values provided in System information.
. . .
Proposal 2:
When the assistance information are different between SIB and dedicated signalling, the UE should use assistance information provided in dedicated signalling.

Although there is not much explanation in 3GPP R2-132797, considering that the purpose of using dedicated signalling is to achieve per-UE control, it seems that the value provided by dedicated signalling which is specific to the UE would be a more suitable choice.

In addition, a similar issue has occurred with respect to other parameters. As discussed in 3GPP TS 36.331 V11.4.0, the value provided by dedicated signalling takes precedence over the value provided by broadcast signalling for the configuration of RLF related timers and constants (such as T310, T311, N310, and/or N311). More specifically, 3GPP TS 36.331 V11.4.0 states:
5.2.2.9 Actions Upon Reception of SystemInformation-BlockType2 Upon receiving SystemInformationBlock-Type2, the UE shall:
[ . . . ]
1> if in RRC_CONNECTED and UE is configured with RLF timers and constants values received within rlf-TimersAndConstants:
2> not update its values of the timers and constants in ue-TimersAndConstants except for the value of timer T300;
Based on the above two viewpoints, it would seem logical to give the value of dedicated signalling higher priority than the value of broadcast signalling. However, if taking individual parameter into account, the precedence of configuration may need more consideration.

Currently the candidates for assistance parameters may include: load information, resource allocation, WLAN threshold, and/or RAN (Radio Access Network) threshold. Among the parameters, it seems that WLAN threshold and RAN threshold are used to control how easily the UEs in a cell could move between WLAN and 3GPP RAN, and the setting of the thresholds may depend on the current cell load (or WLAN load if possible). If network would like a specific UE to move more easily (or less easily) than others (such as considering the UE's traffic demand), the network could give the UE a specific threshold through dedicated signalling.

Since some of the parameters should be used when the UE operates in WLAN, it would be assumed that the value provided by dedicated signalling should still be applied (and not released) when the UE enters RRC_Idle state. However, if dedicated signalling always takes precedence, the value could not be updated until the UE enters the RRC_Connected state again. Therefore, if the network would like to reconfigure the parameter for an idle mode UE, the network would need to bring the UE into connected mode and then perform the reconfiguration using dedicated signalling. However, if the network does so, it would not seem efficient and would cause significant signalling overhead due to idle-to-connected transition.

To solve the problem described above, a general concept for at least one embodiment of the invention is to enable finer control to the configuration of a parameter especially for an idle mode UE. In one embodiment, for the configuration of a parameter of a UE, the value provided in the broadcast signalling could override the value provided in the dedicated signalling when the UE is in idle mode. The dedicated signalling would be received when the UE was in connected mode, and would still be applied in idle mode before being overridden. When the UE is in connected mode, the value provided in the broadcast signalling cannot override the value provided in the dedicated signalling.

In an alternative embodiment, for the configuration of a parameter of a UE, when a value is provided in the broadcast signalling, the broadcast signalling could indicate whether it should override the value provided in the dedicated signalling (if any). The indication could be applied to a UE that is in idle mode, while not be applied to a UE in connected mode.

In another embodiment, for the configuration of a parameter of a UE, a value of the parameter could be provided in the broadcast signalling, and an offset value to the parameter (which may be another parameter) could be provided in the dedicated signalling. If the value provided by the dedicated signalling is configured, the value would need to be used along with the value provided by the broadcast signalling. The two values would be coordinated so there is no issue regarding precedence or overriding. Both values could be applied to an idle mode UE (and also a connected mode UE).

Figure 8:
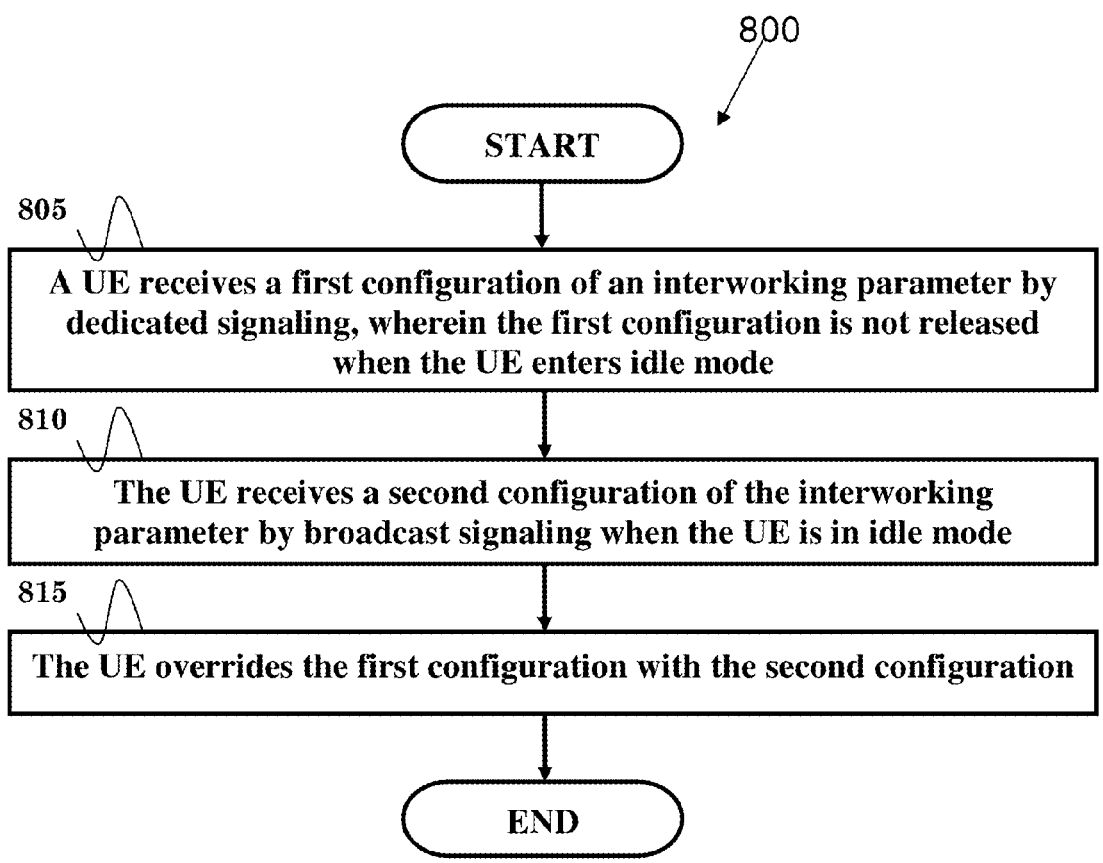
FIG. 8 is a flow chart according to one exemplary embodiment.

FIG. 8 is a flow chart 800 in accordance with one exemplary embodiment. The flow chart 800 generally illustrates a method for applying signalling of WLAN-3GPP interworking from the perspective of a UE. In Step 805, a UE receives a first configuration of an interworking parameter by dedicated signalling, wherein the first configuration is not released when the UE enters idle mode. In Step 810, the UE receives a second configuration of the interworking parameter by broadcast signalling when the UE is in idle mode. In Step 815, the UE overrides the first configuration with the second configuration. In one embodiment, the UE does not override the first configuration with the second configuration when the UE receives the second configuration in connected mode.

Referring back to FIGS. 3 and 4, in one embodiment, the device 300 could include a program code 312 stored in memory 310 for applying signalling of WLAN-3GPP interworking from the perspective of a UE. The CPU 308 could execute the program code 312 to enable the UE (i) to receive a first configuration of an interworking parameter by dedicated signalling, the first configuration is not released when the UE enters idle mode, (ii) to receive a second configuration of the interworking parameter by broadcast signalling when the UE is in idle mode, and (iii) to override the first configuration with the second configuration. In addition, the CPU 308 could execute the program code 312 to perform all of the above-described actions and steps or others described herein.

Figure 9:
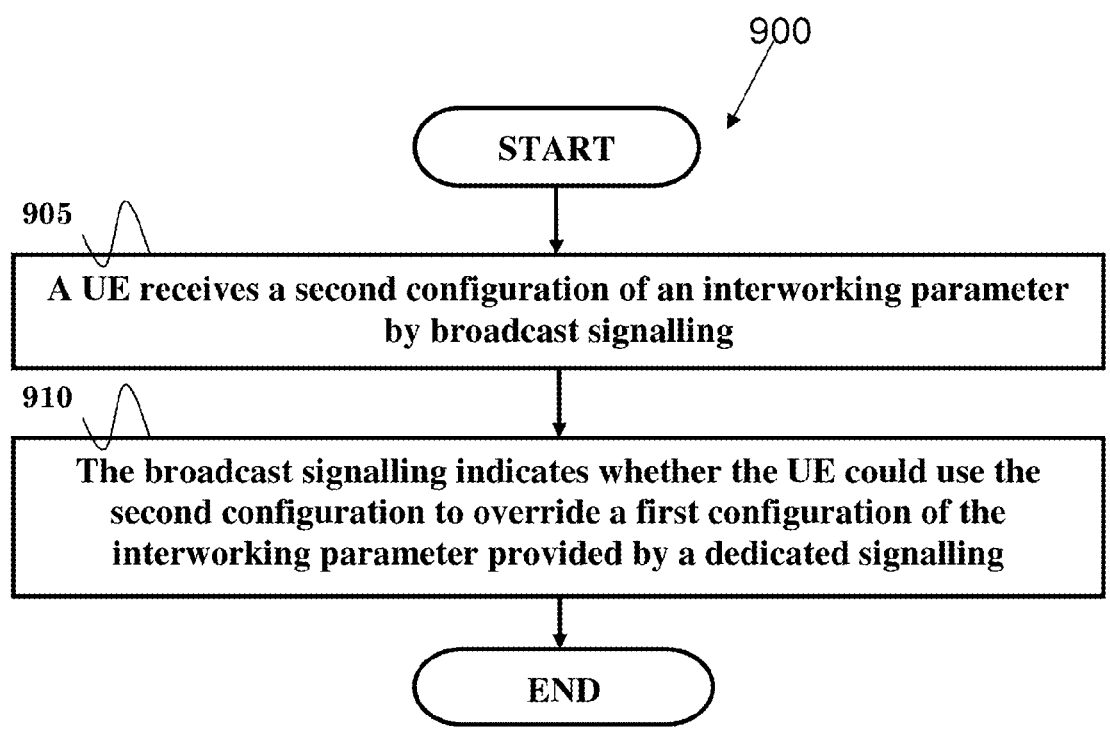
FIG. 9 is a flow chart according to one exemplary embodiment.

FIG. 9 is a flow chart 900 in accordance with one exemplary embodiment. The flow chart 900 generally illustrates an alternative method for applying signalling of WLAN-3GPP interworking from the perspective of a UE. In Step 905, a UE receives a second configuration of an interworking parameter by broadcast signalling. In Step 910, the broadcast signalling indicates whether the UE could use the second configuration to override a first configuration of the interworking parameter provided by a dedicated signalling.

Referring back to FIGS. 3 and 4, in one embodiment, the device 300 could include a program code 312 stored in memory 310 for applying signalling of WLAN-3GPP interworking from the perspective of a UE. The CPU 308 could execute the program code 312 (i) to enable the UE to receive a second configuration of an interworking parameter by broadcast signalling, wherein the broadcast signalling indicates whether the UE could use the second configuration to override a first configuration of the interworking parameter provided by a dedicated signalling. In addition, the CPU 308 could execute the program code 312 to perform all of the above-described actions and steps or others described herein.

Figure 10:
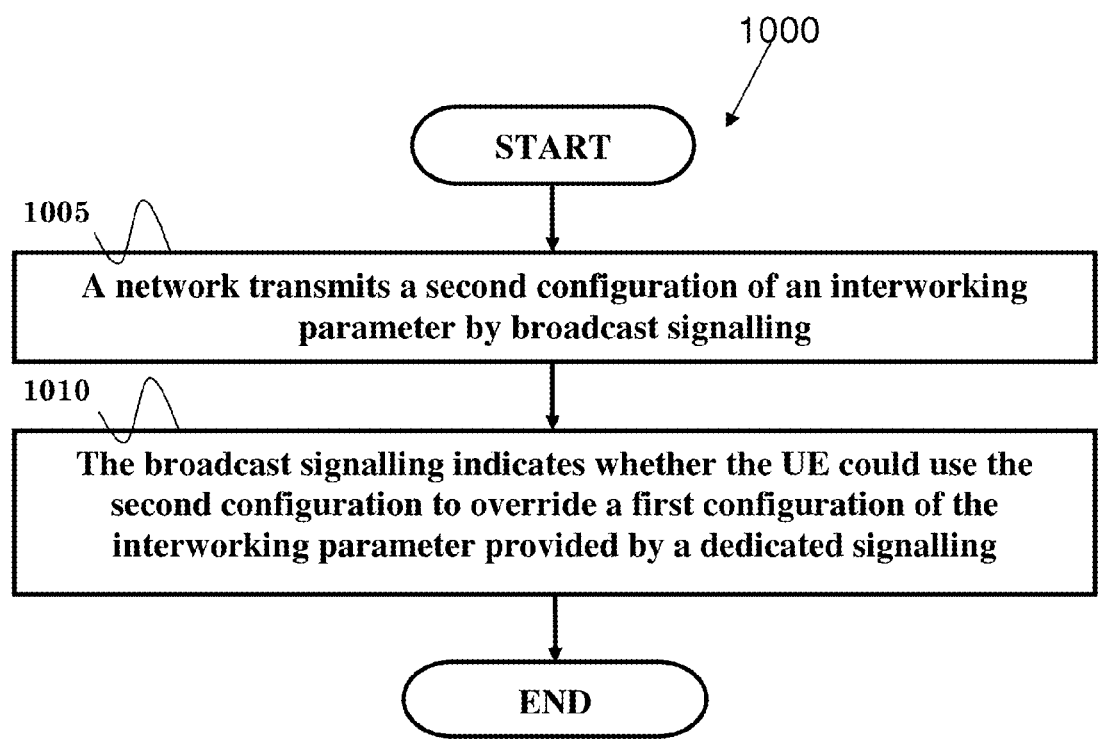
FIG. 10 is a flow chart according to one exemplary embodiment.

FIG. 10 is a flow chart 1000 in accordance with one exemplary embodiment. The flow chart 1000 generally illustrates an alternative method for applying signalling of WLAN-3GPP interworking from the perspective of a network. In Step 1005, the network transmits a second configuration of an interworking parameter by broadcast signalling. In Step 1010, the broadcast signalling indicates whether the UE could use the second configuration to override a first configuration of the interworking parameter provided by a dedicated signalling.

Referring back to FIGS. 3 and 4, in one embodiment, the device 300 could include a program code 312 stored in memory 310 for applying signalling of WLAN-3GPP interworking from the perspective of a network. The CPU 308 could execute the program code 312 (i) to enable a network to transmit a second configuration of an interworking parameter by broadcast signalling, wherein the broadcast signalling indicates whether the UE could use the second configuration to override a first configuration of the interworking parameter provided by a dedicated signalling. In addition, the CPU 308 could execute the program code 312 to perform all of the above-described actions and steps or others described herein.

In one embodiment, the UE could override the first configuration with the second configuration if the broadcast signalling indicates that the second configuration could override the first configuration. Furthermore, the UE would not override the first configuration with the second configuration if the broadcast signalling indicates that the second configuration could not override the first configuration. Alternatively, the UE would not override the first configuration with the second configuration if the broadcast signalling does not indicate that the second configuration could override the first configuration. In addition, the indication in broadcast signalling is used when the UE is in idle mode, or is not used when the UE is in connected mode.

In one embodiment, the second configuration could be used after the overriding.

In one embodiment, the first configuration could be applied when the UE is in idle mode, could be used before the overriding, and/or could be received by system information. In another embodiment, the UE's overriding the first configuration with the second configuration comprises: (i) the UE applies the first configuration before the overriding, (ii) the UE applies the second configuration after the overriding, and (iii) the UE does not apply the first configuration after the overriding.

In one embodiment, the interworking parameter could be used for interworking between 3GPP and WLAN. Also, the interworking parameter could be a RAN (Radio Access Network) threshold or a WLAN (Wireless Local Area Network) threshold. More specifically, the interworking parameter could be a threshold used to judge whether the UE should move its traffic to WLAN, or a threshold used to judge whether the UE should move its traffic to 3GPP RAN, such as E-UTRAN (Evolved Universal Terrestrial Radio Access Network) or UTRAN (Universal Terrestrial Radio Access Network). In addition, the interworking parameter could be a load information, an offload preference indicator, or a resource allocation.

Figure 11:
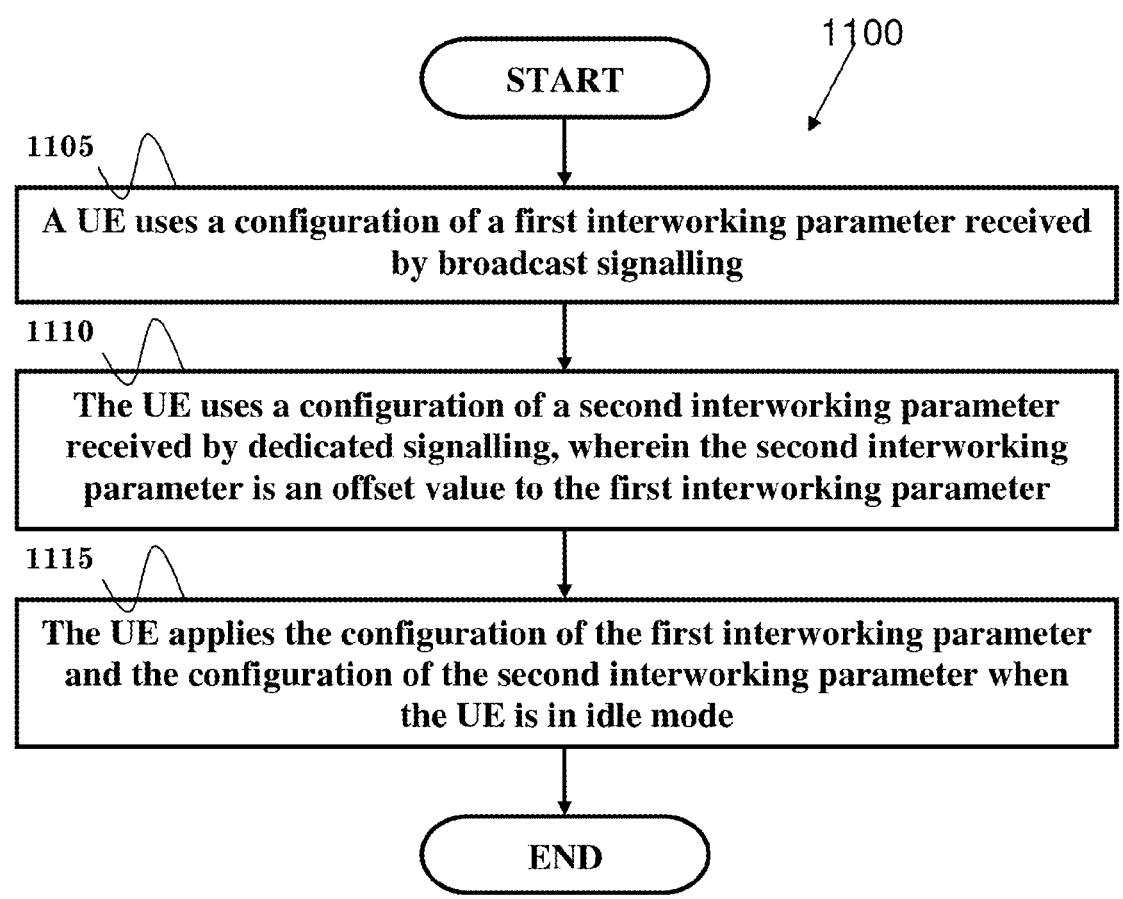
FIG. 11 is a flow chart according to one exemplary embodiment.

FIG. 11 is a flow chart 1100 in accordance with one exemplary embodiment. The flow chart 1100 generally illustrates another method for applying signalling of WLAN-3GPP interworking from the perspective of a UE. In Step 1105, a UE uses a configuration of a first interworking parameter received by broadcast signalling. In Step 1110, the UE uses a configuration of a second interworking parameter received by dedicated signalling, wherein the second interworking parameter is an offset value to the first interworking parameter. In Step 1115, the configuration of the first interworking parameter and the configuration of the second interworking parameter are applied when the UE is in idle mode.

In one embodiment, the configuration of the first interworking parameter is received by system information.

In one embodiment, the first and the second interworking parameters could be used for interworking between a 3GPP and a WLAN. Furthermore, the first interworking parameter could be a RAN threshold or a WLAN threshold. In addition, the first interworking parameter could be a threshold used to judge whether the UE should move its traffic to WLAN, or a threshold used to judge whether the UE should move its traffic to a 3GPP RAN, such as a E-UTRAN or a UTRAN. Also, the interworking parameter could be a load information, an offload preference indicator, or a resource allocation.

In one embodiment, the UE is capable of 3GPP RAN access and WLAN access. More specifically, the UE is capable of connecting to 3GPP RAN and WLAN at the same time. Furthermore, the UE operates in a WLAN when the UE is in idle mode. The idle mode refers to RRC_IDLE where no RRC (Radio Resource Control) connection is established, as discussed in 3GPP TS 36.331 V11.4.0. Furthermore, the connected mode refers to RRC_CONNECTED where a RRC connection is established, as discussed in 3GPP TS 36.331 V11.4.0. Also, the WLAN is based on the IEEE 802.11 standard.

Referring back to FIGS. 3 and 4, in one embodiment, the device 300 could include a program code 312 stored in memory 310 for applying signalling of WLAN-3GPP interworking from the perspective of a UE. The CPU 308 could execute the program code 312 to enable the UE (i) to receive a configuration of a first interworking parameter received by broadcast signalling, (ii) to receive a configuration of a second interworking parameter received by dedicated signaling, wherein the second interworking parameter is an offset value to the first interworking parameter, and (iii) to apply the configuration of the first interworking parameter and the configuration of the second interworking parameter when the UE is in idle mode. In addition, the CPU 308 could execute the program code 312 to perform all of the above-described actions and steps or others described herein.

Another general concept for solving the problem described above is that for an interworking parameter which can be configured via dedicated signalling and via broadcast signalling, a timer could be utilized to control the validity of the configured value provided in the dedicated signalling for the interworking parameter. In one embodiment, a UE would release the configured value provided in the dedicated signalling and would use the value provided in the broadcast signalling when the timer expires. More specifically, the UE would be in idle mode when the timer expires. The value of the timer could be signalled along with the value of the interworking parameter. Alternatively, the value of the timer could be signalled in the message to release the RRC (Radio Resource Control) connection of the UE, or signalled in the system information, or predefined in the 3GPP standards. The timer could be started upon receiving the dedicated configuration or upon entering idle mode.

Figure 12:
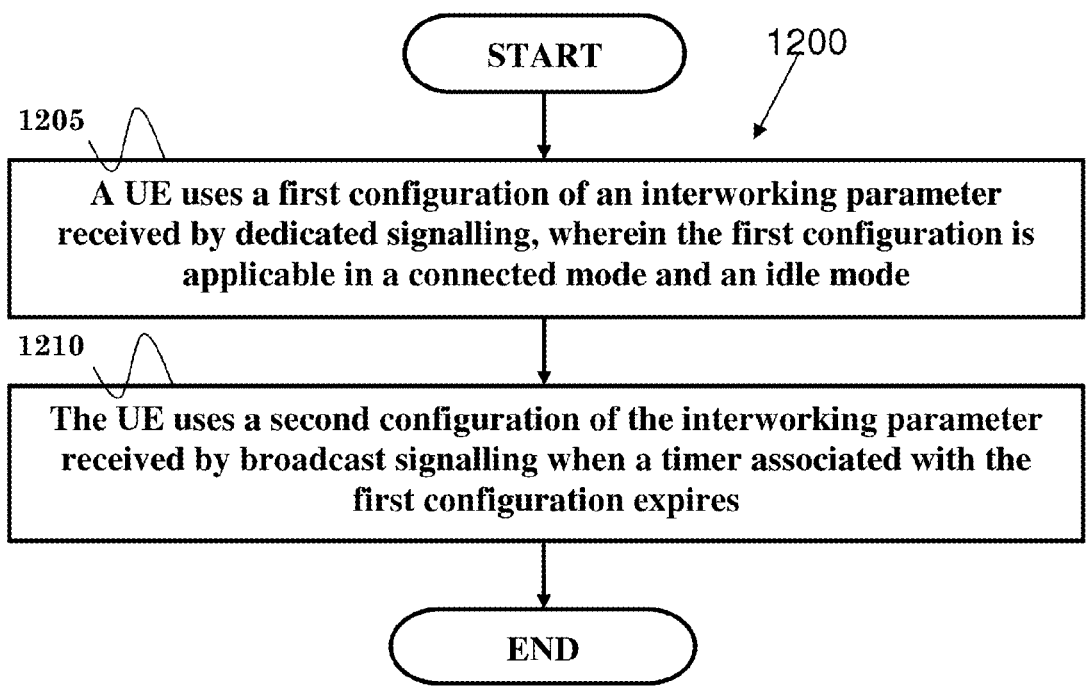
FIG. 12 is a flow chart according to one exemplary embodiment.

FIG. 12 is a flow chart 1200 in accordance with one exemplary embodiment. The flow chart 1200 generally illustrates another method for applying signalling of WLAN-3GPP interworking from the perspective of a UE. In Step 1205, the UE uses a first configuration of an interworking parameter received by dedicated signalling, wherein the first configuration is applicable in a connected mode and an idle mode. In Step 1210, the UE uses a second configuration of the interworking parameter received by broadcast signalling when a timer associated with the first configuration expires.

Referring back to FIGS. 3 and 4, in one embodiment, the device 300 could include a program code 312 stored in memory 310 for applying signalling of WLAN-3GPP interworking from the perspective of a UE. The CPU 308 could execute the program code 312 to enable the UE (i) to use a first configuration of an interworking parameter received by dedicated signalling, wherein the first configuration is applicable in a connected mode and an idle mode, and (ii) to uses a second configuration of the interworking parameter received by broadcast signalling when a timer associated with the first configuration expires. In addition, the CPU 308 could execute the program code 312 to perform all of the above-described actions and steps or others described herein.

Figure 13:
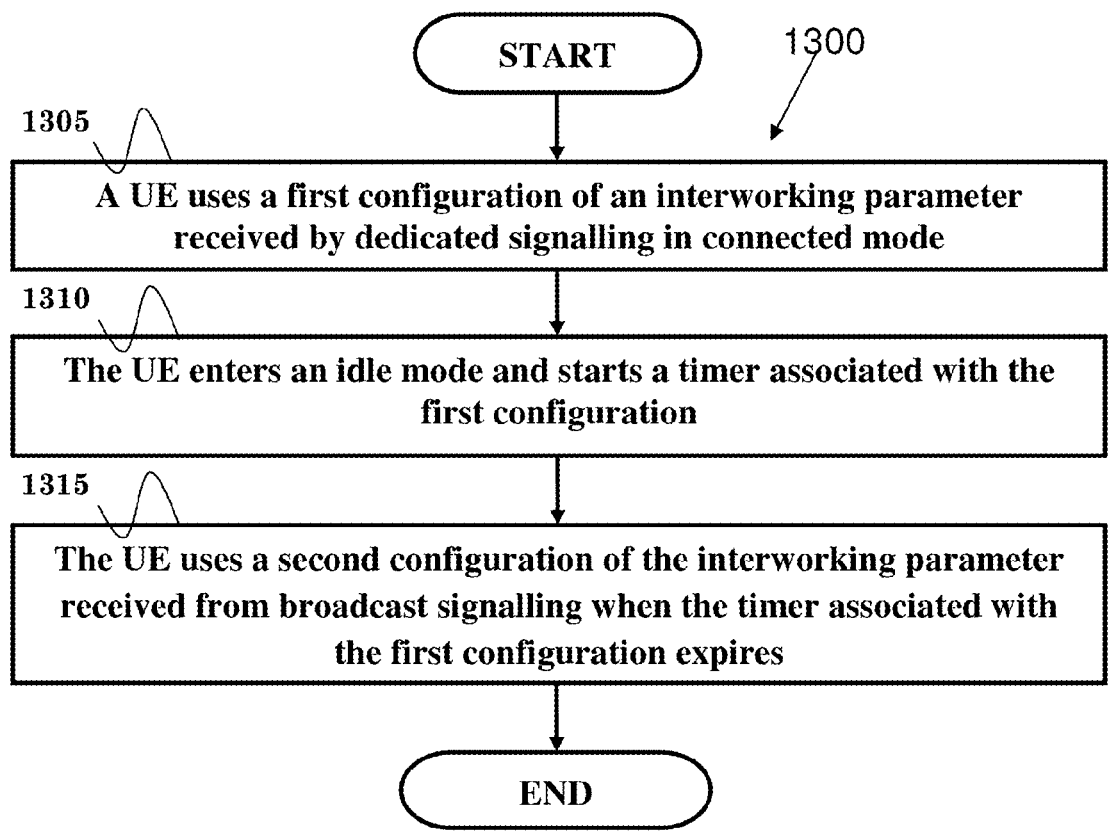
FIG. 13 is a flow chart according to one exemplary embodiment.

FIG. 13 is a flow chart 1300 in accordance with one exemplary embodiment. The flow chart 1300 generally illustrates another method for applying signalling of WLAN-3GPP interworking from the perspective of a UE. In Step 1305, the UE uses a first configuration of an interworking parameter received by dedicated signalling in connected mode. In Step 1310, the UE enters an idle mode and starts a timer associated with the first configuration. In Step 1315, the UE uses a second configuration of the interworking parameter received from broadcast signalling when the timer associated with the first configuration expires.

Referring back to FIGS. 3 and 4, in one embodiment, the device 300 could include a program code 312 stored in memory 310 for applying signalling of WLAN-3GPP interworking from the perspective of a UE. The CPU 308 could execute the program code 312 to enable the UE (i) to use a first configuration of an interworking parameter received by dedicated signalling, wherein the first configuration is applicable in a connected mode and an idle mode, (ii) to enter an idle mode and starts a timer associated with the first configuration, and (iii) to use a second configuration of the interworking parameter received by broadcast signalling when the timer associated with the first configuration expires. In addition, the CPU 308 could execute the program code 312 to perform all of the above-described actions and steps or others described herein.

In one embodiment, the UE overrides the first configuration with the second configuration when the timer expires. Alternatively, the UE releases the first configuration when the timer expires. Furthermore, the UE is in idle mode when the timer expires. In another embodiment, the second configuration does not override the first configuration when the UE is in connected mode.

In one embodiment, the UE is capable of 3GPP RAN access and WLAN access. More specifically, the UE is capable of connecting to a 3GPP RAN and a WLAN at the same time. Also, the UE operates in a WLAN when the UE is in idle mode. The idle mode refers to RRC_IDLE where no RRC (Radio Resource Control) connection is established, as discussed in 3GPP TS 36.331 V11.4.0. Furthermore, the connected mode refers to RRC_CONNECTED where a RRC connection is established, as discussed in 3GPP TS 36.331 V11.4.0. Also, the WLAN is based on the IEEE 802.11 standard.

In one embodiment, the timer could be started when the UE receives the first configuration, when the UE receives the configuration of the timer, or when the UE enters idle mode. Also, the configuration of the timer could be received along with the first configuration, or could be received in the message to release the RRC connection of the UE. Furthermore, the value of the timer could be broadcasted in a system information, or could be predefined.

In one embodiment, the interworking parameter could be used for interworking between 3GPP and WLAN. In addition, the interworking parameter could be a RAN (Radio Access Network) threshold or a WLAN (Wireless Local Area Network) threshold. More specifically, the interworking parameter could be a threshold used to judge whether the UE should move its traffic to WLAN, or a threshold used to judge whether the UE should move its traffic to a 3GPP RAN, such as a E-UTRAN or a UTRAN. Also, the interworking parameter could be a load information, an offload preference indicator, or a resource allocation.

With above embodiment(s), finer control can be enabled for an idle mode UE which has already been configured with dedicated value of an interworking parameter. In addition, an idle mode UE which has already been configured with dedicated value of an interworking parameter can be updated with the latest value.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for applying signalling of interworking between WLAN (Wireless Local Area Network) and 3GPP ($3^{rd}$ Generation Partnership Project) in a UE (User Equipment), comprising:
   receiving a first dedicated signaling message including a first configuration of an interworking parameter and a configuration of a timer;
   using the first configuration of the interworking parameter in a connected mode, wherein the first configuration is applicable in the connected mode and an idle mode;
   starting the timer associated with the first configuration when the UE enters the idle mode in response to reception of a second signalling message to release a RRC (Radio Resource Control) connection; and
   using a second configuration of the interworking parameter received by broadcast signalling when the timer associated with the first configuration expires.

2. The method of claim 1, wherein the UE is in idle mode when the timer expires.

3. The method of claim 1, wherein the UE releases the first configuration when the timer expires.

4. The method of claim 1, wherein the UE does not override the first configuration with the second configuration when the UE is in connected mode.

5. The method of claim 1, wherein the interworking parameter is used for interworking between 3GPP and WLAN.

6. The method of claim 1, wherein the interworking parameter is a threshold used to judge whether the UE should move its traffic to WLAN, or a threshold used to judge whether the UE should move its traffic to a 3GPP RAN, such as a E-UTRAN (Evolved Universal Terrestrial Radio Access Network) or a UTRAN (Universal Terrestrial Radio Access Network).

7. The method of claim 1, wherein the UE is capable of connecting to a 3GPP RAN and a WLAN at the same time.

8. A communication device for applying signalling of interworking between WLAN (Wireless Local Area Network) and 3GPP (3$^{rd}$ Generation Partnership Project) for a UE (User Equipment) in a wireless communication system, the communication device comprising:
  a control circuit;
  a processor installed in the control circuit;
  a memory installed in the control circuit and operatively coupled to the processor;
  wherein the processor is configured to execute a program code stored in the memory to apply signalling of interworking between WLAN and 3GPP in a wireless communication system by:
    receiving a first dedicated signaling message including a first configuration of an interworking parameter and a configuration of a timer;
    using the first configuration of the interworking parameter in a connected mode, wherein the first configuration is applicable in the connected mode and an idle mode;
    starting the timer associated with the first configuration when the UE enters the idle mode in response to reception of a second signalling message to release a RRC (Radio Resource Control) connection; and
    using a second configuration of the interworking parameter received by broadcast signalling when the timer associated with the first configuration expires.

9. The communication device of claim 8, wherein the communication device is in idle mode when the timer expires.

10. The communication device of claim 8, wherein the communication device releases the first configuration when the timer expires.

11. The communication device of claim 8, wherein the communication device does not override the first configuration with the second configuration when the communication device is in connected mode.

12. The communication device of claim 8, wherein the interworking parameter is used for interworking between 3GPP and WLAN.

13. The communication device of claim 8, wherein the interworking parameter is a threshold used to judge whether the communication device should move its traffic to WLAN, or a threshold used to judge whether the communication device should move its traffic to a 3GPP RAN, such as a E-UTRAN (Evolved Universal Terrestrial Radio Access Network) or a UTRAN (Universal Terrestrial Radio Access Network).

14. The communication device of claim 8, wherein the communication device is capable of connecting to a 3GPP RAN and a WLAN at the same time.

* * * * *